(12) United States Patent
Mason et al.

(10) Patent No.: US 8,430,202 B1
(45) Date of Patent: Apr. 30, 2013

(54) COMPACT HIGH-PRESSURE EXHAUST MUFFLING DEVICES

(75) Inventors: Jeffrey Lee Mason, Sharonville, OH (US); Daniel Alexander Sieg, West Chester, OH (US); Carlos Eduardo Gutierrez, Cincinnati, OH (US); John Carl Glessner, Kings Mills, OH (US); Charles Steve Lawless, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/347,728

(22) Filed: Jan. 11, 2012

Related U.S. Application Data

(60) Provisional application No. 61/580,675, filed on Dec. 28, 2011.

(51) Int. Cl.
 *B64D 33/04* (2006.01)
(52) U.S. Cl.
 USPC .............. 181/210; 181/214; 415/119; 60/785
(58) Field of Classification Search .................. 181/210, 181/214, 237; 415/119, 144; 60/782, 785
 See application file for complete search history.

(56) References Cited

U.S. PATENT DOCUMENTS

| 700,785 A | 5/1902 | Kull |
| 1,473,349 A | 11/1923 | Kach |
| 1,539,595 A | 5/1925 | Powell |
| 1,697,794 A | 1/1929 | Stranahan |
| 1,794,276 A | 2/1931 | Bowes |
| 2,701,557 A | 2/1955 | Ramey |
| 2,919,761 A | 1/1960 | Smith |
| 2,929,248 A | 3/1960 | Sprenkle |
| 3,016,972 A | 1/1962 | Dugas |
| 3,092,206 A | 6/1963 | Moreau |
| 3,105,570 A | 10/1963 | Bezemes |

(Continued)

FOREIGN PATENT DOCUMENTS

| EP | 2136053 | 12/2009 |
| EP | 2184447 | 5/2010 |
| EP | 2184448 | 5/2010 |

OTHER PUBLICATIONS

GB Search Report and Opinion dated Oct. 26, 2011, in application No. GB1112835.2.

(Continued)

*Primary Examiner* — Jeremy Luks
(74) *Attorney, Agent, or Firm* — General Electric Company; Matthew P. Hayden; David J. Clement

(57) ABSTRACT

Compact, high-pressure exhaust muffling devices are disclosed. Some example muffling devices may include an inner flow conditioner including an inlet configured to convey a pressurized fluid flow into an inner flow conditioner interior. The inner flow conditioner may include a plurality of inner flow conditioner holes. The muffling device may include an exhaust can disposed substantially around the inner flow conditioner and arranged to receive the pressurized fluid flow via the inner flow conditioner holes into an exhaust can interior. The exhaust can may include a plurality of exhaust screen holes arranged to discharge the pressurized fluid flow from the exhaust can interior. The exhaust can interior may be substantially devoid of flow obstructions between the plurality of inner flow conditioner holes and the exhaust screen holes.

13 Claims, 6 Drawing Sheets

U.S. PATENT DOCUMENTS

| | | |
|---|---|---|
| 3,120,877 A | 2/1964 | Morris et al. |
| 3,159,238 A | 12/1964 | Shearer |
| 3,191,630 A | 6/1965 | Demyan |
| 3,338,331 A | 8/1967 | Jettinghof |
| 3,398,881 A | 8/1968 | Greenberg et al. |
| 3,493,169 A | 2/1970 | Abild et al. |
| 3,545,492 A | 12/1970 | Scheid |
| 3,572,391 A | 3/1971 | Hirsch |
| 3,632,223 A | 1/1972 | Hampton |
| 3,665,965 A | 5/1972 | Baumann |
| 3,692,140 A | 9/1972 | Smith |
| 3,777,489 A | 12/1973 | Johnson et al. |
| 3,840,051 A | 10/1974 | Akashi et al. |
| 3,945,759 A | 3/1976 | Bobo |
| 3,951,566 A | 4/1976 | Mattei et al. |
| 3,964,519 A | 6/1976 | De Baun |
| 4,022,112 A | 5/1977 | Putt et al. |
| 4,113,050 A | 9/1978 | Smith |
| 4,128,769 A | 12/1978 | Bons et al. |
| 4,130,173 A | 12/1978 | Cooksey |
| 4,132,285 A | 1/1979 | Milde et al. |
| 4,142,413 A | 3/1979 | Bellinga |
| 4,156,344 A | 5/1979 | Cuthbertson et al. |
| 4,177,780 A | 12/1979 | Pellerin |
| 4,244,440 A | 1/1981 | Matta et al. |
| 4,244,441 A | 1/1981 | Tolman |
| 4,375,841 A | 3/1983 | Vielbig |
| 4,463,552 A | 8/1984 | Monhardt et al. |
| 4,537,277 A * | 8/1985 | Bryce ............ 181/214 |
| 4,610,326 A | 9/1986 | Kirchweger et al. |
| 4,685,533 A | 8/1987 | Piesik |
| 4,890,691 A | 1/1990 | Ching-ho |
| 4,979,587 A | 12/1990 | Hirt et al. |
| 5,205,719 A | 4/1993 | Childs et al. |
| 5,261,228 A | 11/1993 | Shuba |
| 5,266,754 A | 11/1993 | Swift |
| 5,327,941 A | 7/1994 | Bitsakis et al. |
| 5,428,954 A | 7/1995 | Cowan, Sr. |
| 5,429,102 A | 7/1995 | Edwards et al. |
| 5,495,872 A | 3/1996 | Gallagher et al. |
| 5,557,917 A | 9/1996 | Jaw |
| 5,758,488 A | 6/1998 | Batey |
| 6,145,544 A | 11/2000 | Dutertre et al. |
| 6,415,747 B1 | 7/2002 | Asano et al. |
| 6,558,137 B2 | 5/2003 | Tomell et al. |
| 6,565,313 B2 * | 5/2003 | Nikkanen et al. ............ 415/144 |
| 6,588,195 B2 * | 7/2003 | Negulescu ............ 60/785 |
| 6,695,094 B2 | 2/2004 | Moffat et al. |
| 6,776,589 B2 | 8/2004 | Tomell et al. |
| 6,880,579 B2 | 4/2005 | Boger |
| 7,089,963 B2 | 8/2006 | Meheen |
| 7,146,961 B1 | 12/2006 | Westcott |
| 7,210,912 B2 | 5/2007 | Tomell et al. |
| 7,267,297 B2 | 9/2007 | Campbell et al. |
| 7,344,107 B2 | 3/2008 | Campbell et al. |
| 7,364,116 B2 | 4/2008 | Nguyen et al. |
| 7,367,424 B2 | 5/2008 | Brown et al. |
| 7,387,188 B2 | 6/2008 | Keller et al. |
| 7,431,125 B2 | 10/2008 | Williams |
| 7,448,469 B2 | 11/2008 | Seyler et al. |
| 7,513,119 B2 | 4/2009 | Zielinski et al. |
| 7,611,093 B2 | 11/2009 | Campbell et al. |
| 7,730,995 B2 * | 6/2010 | Hunt et al. ............ 181/213 |
| 7,762,374 B2 | 7/2010 | Turner et al. |
| 7,765,784 B2 | 8/2010 | Lwasa et al. |
| 7,797,945 B2 * | 9/2010 | Appleby et al. ............ 60/795 |
| 7,798,285 B2 | 9/2010 | Chiou et al. |
| 7,891,605 B2 | 2/2011 | Nguyen et al. |
| 8,016,071 B1 | 9/2011 | Martinus et al. |
| 2004/0238123 A1 | 12/2004 | Becknell et al. |
| 2005/0067218 A1 * | 3/2005 | Bristow et al. ............ 181/237 |
| 2010/0043447 A1 | 2/2010 | Kirby |
| 2010/0236256 A1 * | 9/2010 | Hussain et al. ............ 60/785 |
| 2011/0265490 A1 | 11/2011 | Klasing et al. |
| 2012/0006615 A1 | 1/2012 | Klasing et al. |

OTHER PUBLICATIONS

Phong et al., "Noise Reduction of a Turbofan Bleed Valve," 50th AIAA Aerospace Sciences Meeting, Nashville, Tennessee, Jan. 9-12, 2012.

US 7,270,294, 09/2007, Campbell (withdrawn)

* cited by examiner

COMPACT HIGH-PRESSURE EXHAUST MUFFLING DEVICES

CROSS REFERENCE TO RELATED APPLICATION

This application claims the benefit of U.S. Provisional Application No. 61/580,675, filed Dec. 28, 2011, which is incorporated by reference.

BACKGROUND

The subject matter disclosed herein relates generally to muffling systems, and, more specifically, to muffling devices capable of inducing high pressure drops and desirable flow properties.

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generate engine thrust to propel an aircraft in flight or to power a load, such as an electrical generator.

In some gas turbine engines, a portion of the high-pressure air, such as, for example, bleed air from a compressor, may be extracted or bled from the compressor for various needs. These needs include, for example, compressor flow bleeding which may be used in order to improve operability as well as to provide turbine cooling, pressurize bearing sumps, purge air or provide aircraft environment control. The air may be bled off from the compressor using bleed slots located over specific portions or stages of the compressor.

The problem: In least some gas turbine engines, during engine operation occurring in some operating conditions, the compressor may pump more air than is required for needs including the combustion process. In order to manage operability of the engine and combustion performance, a portion of the excess bleed air from the compressor may be routed through bleed conduits and exhausted into the by-pass flow stream, engine exhaust, or to ambient. The pressure and temperature of the air stream bled from the compressor may be very high. For example, bleed air pressure may be greater than about 1375 kPa and the bleed air temperature may be greater than about 538 degrees C. A transient bleed valve system (TBV) system is sometimes used for bleeding and exhausting the air removed from the compressor. Certain conventional designs for bleed exhaust systems use large and/or heavy muffling devices to reduce the generated noise. For example, the exhaust area of some conventional bleed systems may be set to lower the flow velocity at the exhaust location to a level below that required to meet the acoustic limits for the application. The exhaust area, as well as the relatively gently expansions between the source pressure and exhaust, may contribute to the relatively large size and/or weight of these systems. In some applications (e.g., aircraft), it may be undesirable to use large and/or heavy components.

In addition, some conventional exhaust designs on aircraft may require extensive thermal shielding on other components near the exhaust location, once the exhaust velocities that meet the acoustic limits are achieved. Due to the nature of the high temperature air, once it is over-expanded to achieve lower velocities, the air it mixes with may overwhelm the bleed air, causing it to "lay down" on the surrounding structure around the engine. In some aircraft the surrounding structure may be made of lightweight composite material, or of other metallic material with lesser temperature capability.

BRIEF DESCRIPTION OF THE INVENTION

The solution for the above-mentioned problem is provided by the present disclosure to include example embodiments, provided for illustrative teaching and not meant to be limiting.

An example muffling device according to at least some aspects of the present disclosure may include an inner flow conditioner comprising an inlet, the inlet being configured to convey a pressurized fluid flow into an inner flow conditioner interior, the inner flow conditioner comprising a plurality of inner flow conditioner holes; and an exhaust can disposed substantially around the inner flow conditioner and arranged to receive the pressurized fluid flow via the inner flow conditioner holes into an exhaust can interior, the exhaust can comprising an exhaust screen comprising a plurality of exhaust screen holes arranged to discharge the pressurized fluid flow from the exhaust can interior. The exhaust can interior may be substantially devoid of flow obstructions between the plurality of inner flow conditioner holes and the exhaust screen holes. A ratio of an effective flow area of the inner flow conditioner holes to an effective flow area of the inlet may be about 0.7 to about 1.75. A ratio of an effective flow area of the exhaust screen holes to the effective flow area of the inlet may be about 0.9 to about 2.8.

An example muffling device according to at least some aspects of the present disclosure may include an inner flow conditioner comprising an inlet, the inlet being configured to convey a pressurized fluid flow into an inner flow conditioner interior, the inner flow conditioner comprising a plurality of inner flow conditioner holes; and an exhaust can disposed substantially around the inner flow conditioner and arranged to receive the pressurized fluid flow via the inner flow conditioner holes into an exhaust can interior, the exhaust can comprising an exhaust screen comprising a plurality of exhaust screen holes arranged to discharge the pressurized fluid flow from the exhaust can interior. The exhaust can interior may be substantially devoid of flow obstructions between the plurality of inner flow conditioner holes and the exhaust screen holes. A ratio of a volume of the inner flow conditioner interior to a volume of the exhaust can interior may be about 0.06 to about 0.40.

An example muffling device according to at least some aspects of the present disclosure may include an inner flow conditioner shaped as a generally conical frustum comprising an upstream base and a downstream base, a diameter of the upstream base being larger than a diameter of the downstream base. The inner flow conditioner may include an inlet approximate the upstream base, a generally circular inner flow conditioner downstream end wall, the inner flow conditioner downstream end wall being generally orthogonal to a longitudinal axis of the conical frustum and comprising a plurality of generally longitudinally oriented inner flow conditioner downstream end wall holes, and an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes. The example muffling device may include an exhaust can disposed substantially around the inner flow conditioner and shaped as a generally circular cylinder. The exhaust can my include a generally annular upstream end wall disposed approximate the upstream base of the inner flow conditioner and substantially circumscribing the upstream base of the inner flow conditioner, a generally circular exhaust screen comprising a plurality of exhaust screen holes, and a generally circular exhaust can sidewall extending from approximate the upstream end wall to approximate the exhaust screen. The inner flow conditioner and the exhaust can may be configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
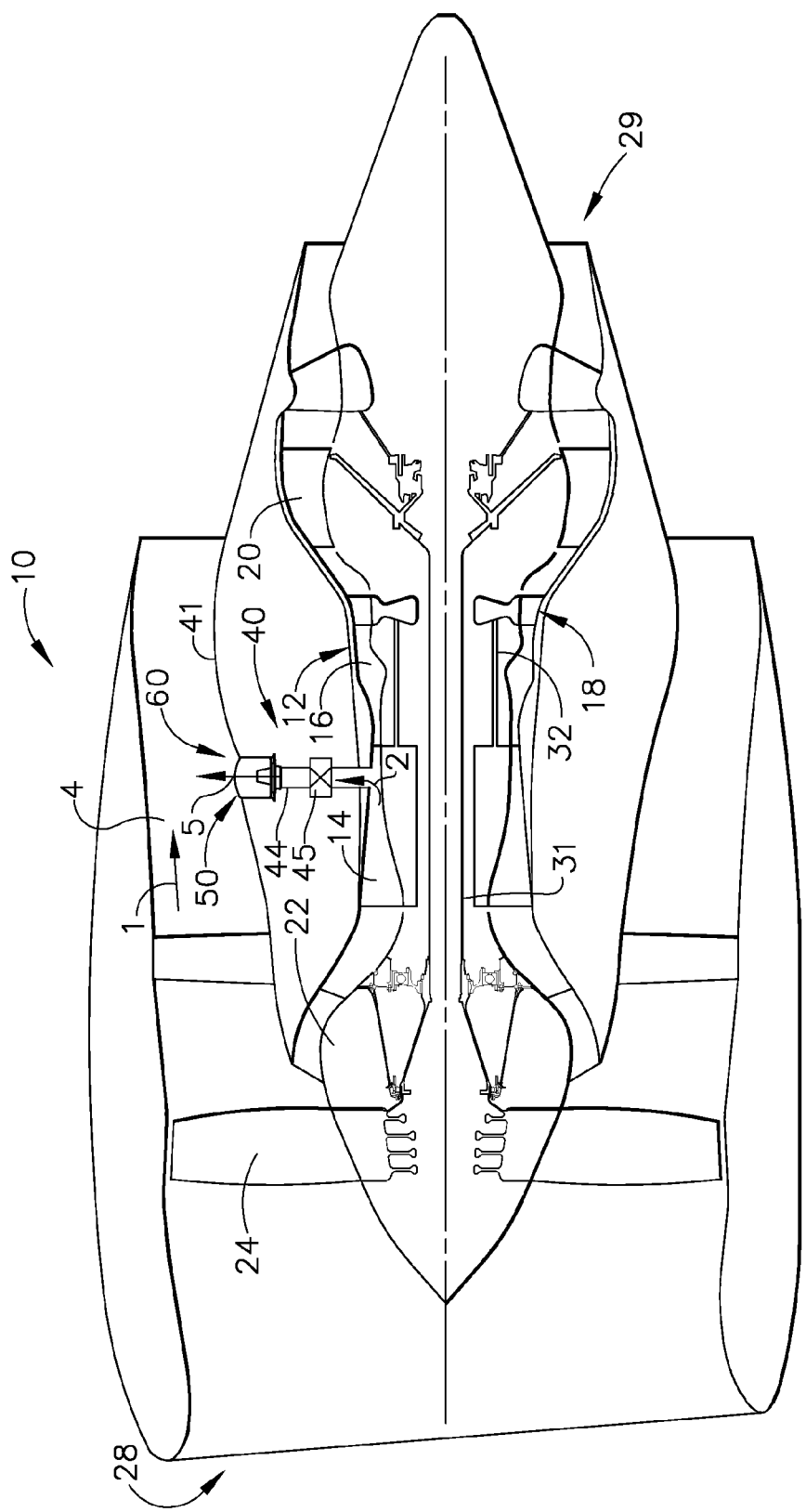
FIG. 1 is a schematic cross-sectional view of an example gas turbine engine assembly including an example bleed system including an example muffling device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, muffling systems, and more specifically muffling devices capable of inducing high pressure drops and desirable flow properties.

The present disclosure contemplates that modern, highly efficient turbofan engines may use high-pressure/high-temperature bleed from the aft compressor stages to improve operability and performance. This bleed air may be directed into the fan duct or other locations, which may generate additional noise during some phases of engine operation.

Some example embodiments according to the present disclosure provide a compact, lightweight transient/operability bleed exhaust muffling device (which may be referred to generally as a "pepperpot") that has minimal acoustic impact. Acoustic benefit for the high pressure/temperature compressor discharge bleed may be achieved at a high exhaust velocity into the fan duct and, in some example embodiments, may use only a single flow conditioning element (which may be referred to as an "inner flow conditioner") within the pepperpot body (which may be referred to as an "exhaust can"). Some such embodiments may be referred to as "single stage" muffling devices. The present disclosure contemplates that some other acoustic pepperpots may utilize multiple (e.g., three to five or more) inner flow conditioning elements, which may add weight to the engine.

In addition, the present disclosure contemplates that some other acoustically friendly pepperpots may necessitate extensive shielding on the thrust reverser structure to address thermal concerns. Some example embodiments according to the present disclosure may reduce or eliminate the need for such shielding by directing at least a substantial portion of the high-temperature bleed air generally to the middle of the cool fan duct flow, which may allow the hot plume to exit the fan duct without substantially impinging on thrust reverser or other aircraft surfaces.

Figure 2:
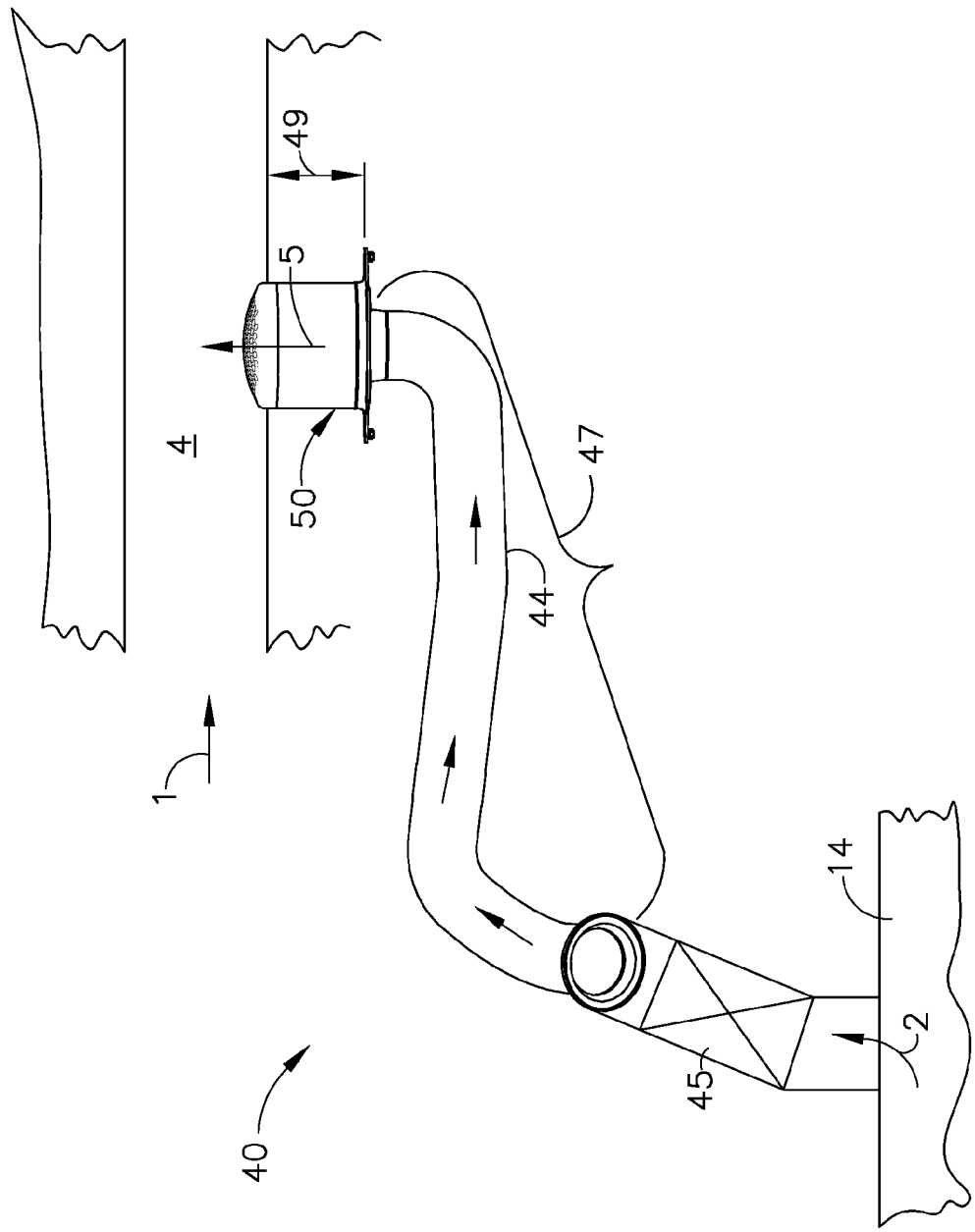
FIG. 2 is a perspective view of an example bleed system including an example muffling device.

FIG. 1 is a schematic cross-sectional view of an example gas turbine engine assembly 10 including an example bleed system 40 including an example muffling device 50, according to at least some aspects of the present disclosure. FIG. 2 is a perspective view of bleed system 40 including muffling device 50, according to at least some aspects of the present disclosure. The gas turbine engine assembly 10 includes a core gas turbine engine 12 that includes a high-pressure compressor 14, a combustor 16, and a high-pressure turbine 18. In the example embodiment shown in FIG. 1, the gas turbine engine assembly 10 also includes a low-pressure turbine 20 coupled axially downstream from core gas turbine engine 12 and a fan assembly 22 coupled axially upstream from core gas turbine engine 12. Fan assembly 22 includes an array of fan blades 24 that extend radially outward from a rotor disk. In the exemplary embodiment shown in FIG. 1, gas turbine engine assembly 10 has an intake side 28 and an exhaust side 29. Core gas turbine engine 12, fan assembly 22, and low-pressure turbine 20 are coupled together by a first rotor shaft 31, and high-pressure compressor 14 and high-pressure turbine 18 are coupled together by a second rotor shaft 32.

In operation, air flows through fan blades 24 and is supplied to high-pressure compressor 14. The air discharged from fan assembly 22 is channeled to high-pressure compressor 14 where the airflow is further compressed and channeled to combustor 16. Products of combustion from combustor 16 are utilized to drive high-pressure turbine 18 and low-pressure turbine 20, and turbine 20 drives fan assembly 22 via shaft 31.

In an example gas turbine engine assembly 10, at certain operating conditions, a portion of the compressed air may be routed through the bleed system 40, thereby becoming bleed air 2. Bleed air 2 from high-pressure compressor 14 may enter a bleed flow conduit 44. Bleed air 2 may pass through the bleed flow conduit 44 and enter muffling device 50 that directs bleed air 2 into a flow path, such as the by-pass flow path 4 and mixes that air with another flow, such as a fan flow stream 1. Flow through bleed flow conduit 44 may be controlled by a bleed air valve 45. Bleed flow conduit 44 may be made from a variety of materials, such as a metal, which may be selected to be capable of withstanding a bleed air 2 flow that is relatively hot and at high pressure.

Muffling device 50, described in more detail herein below, may be in flow communication with bleed flow conduit 44 such that the bleed air 2 is discharged as exit flow stream 5 into by-pass flow path 4, facilitating a reduction of the noise generated by the mixing of the exit flow stream 5 and fan flow stream 1.

As shown in FIG. 2, bleed flow conduit 44 may have a length 47 between bleed air valve 45 and muffling device 50.

Figure 3:
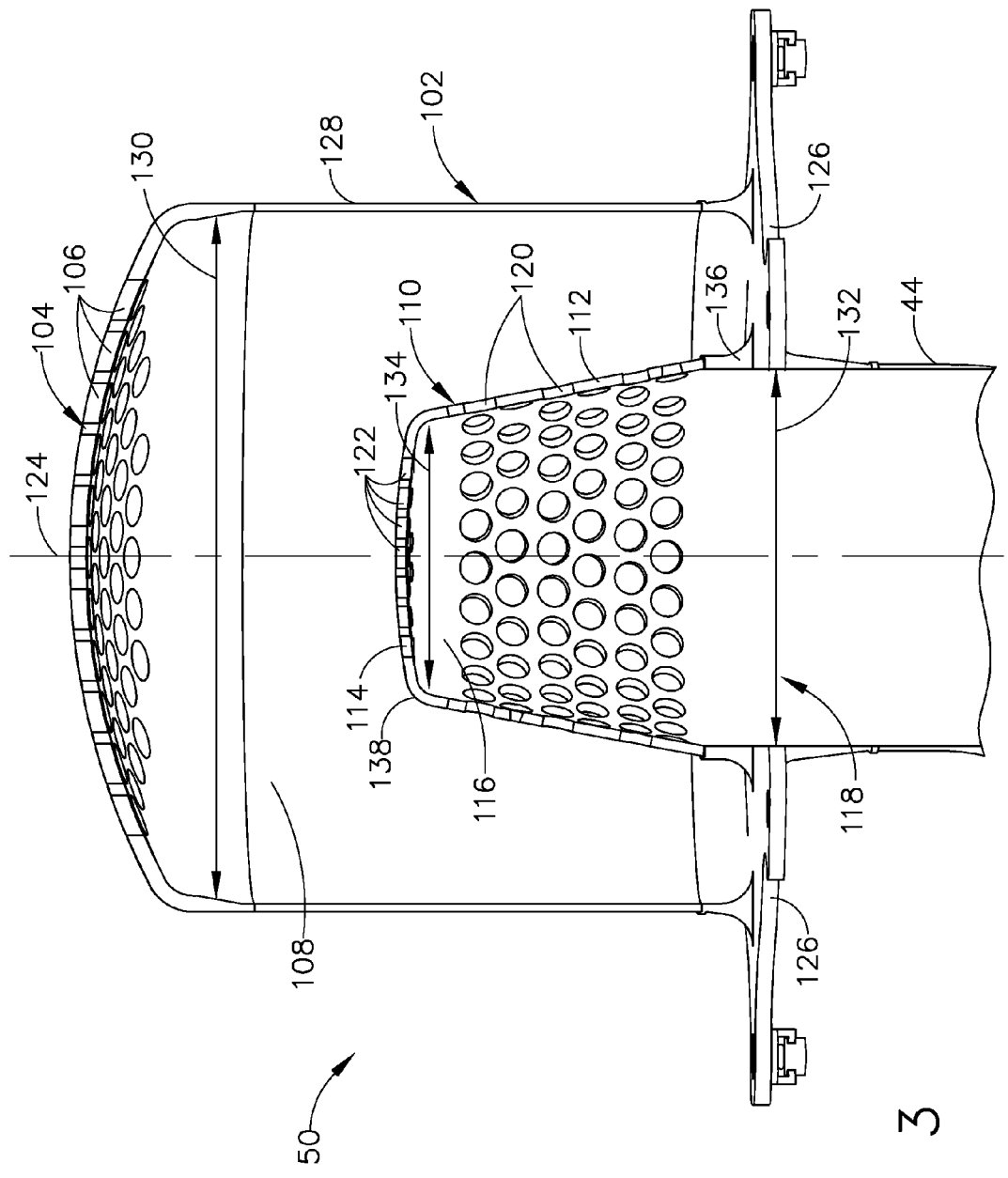
FIG. 3 is a cross-sectional view of an example muffling device.

Muffling device 50 may have a length 49 between bleed flow conduit 44 and by-pass flow path 4, such as the length of exhaust can 102 (FIG. 3). In some example embodiments according to at least some aspects of the present disclosure, length 49 of muffling device 50 may be less than about half of the sum of length 49 of muffling device and length 47 of bleed flow conduit 44. In some example embodiments according to at least some aspects of the present disclosure, length 49 of muffling device 50 may be less than about one third of the sum of length 49 of muffling device and length 47 of bleed flow conduit 44. In some example embodiments according to at least some aspects of the present disclosure, length 49 of muffling device 50 may be less than about one quarter of the sum of length 49 of muffling device and length 47 of bleed flow conduit 44. In some example embodiments according to at least some aspects of the present disclosure, some or all of the acoustic improvements provided by this device occur within the exhaust can (e.g., within length 49), which may allow the use of relatively small diameter and lightweight ducting to direct the flow to a location very close to the exhaust can.

Figure 4:
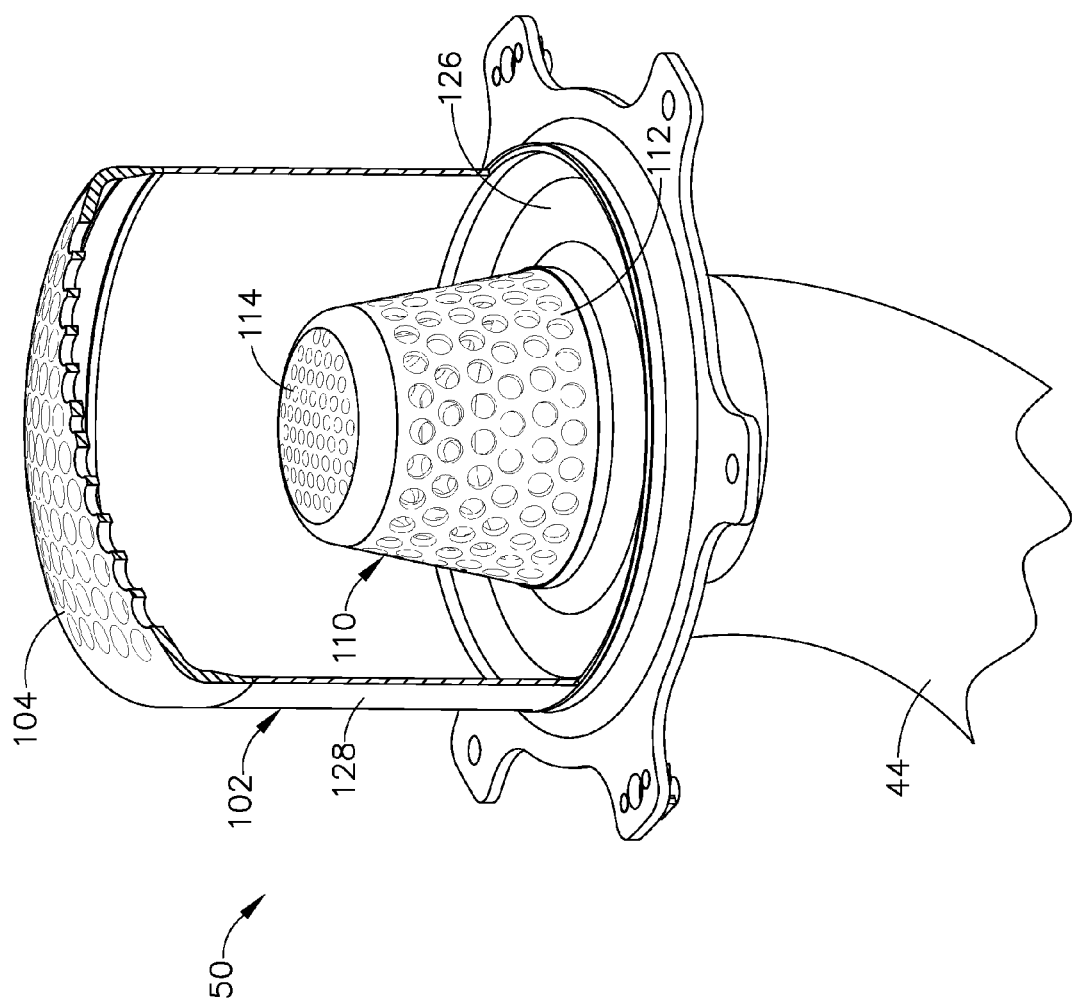
FIG. 4 is a partial-cutaway, perspective view of an example muffling device.

FIG. 3 is a cross-sectional view of an example muffling device 50, according to at least some aspects of the present disclosure. FIG. 4 is a partial-cutaway, perspective view of an example muffling device 50, according to at least some aspects of the present disclosure. Muffling device 50 may comprise an exhaust can 102, which may include an exhaust screen 104 (which may be generally circular), an upstream end wall 126 (which may be generally annular), and a sidewall 128 (which may be generally circular). Exhaust can 102 may be generally in the form of a hollow circular cylinder arranged about a central axis 124 with a diameter 130. Exhaust screen 104 may include a plurality of holes 106 through which air may be discharged from an interior 108 of exhaust can 102. In some example embodiments, exhaust screen 104 may be outwardly curved.

In some example embodiments according to at least some aspects of the present disclosure, an inner flow conditioner 110 may be disposed within exhaust can 102. Inner flow conditioner 110 may be generally in the form of a hollow, conical frustum arranged coaxially with exhaust can 102 about central axis 124. Inner flow conditioner 110 may include an inwardly tapering sidewall 112 and a downstream end wall 114, which may be generally circular. Sidewall 112 may be shaped generally as a truncated cone. Downstream end wall 114 may be generally orthogonal to central axis 124. Inner flow conditioner 110 may taper inwardly from an upstream base 136 (which may be substantially circumscribed by upstream end wall 126) to a downstream base 138 (which may be proximate downstream end wall 114). Sidewall 112 and downstream end wall 114 may at least partially define an interior 116 of inner flow conditioner 110. Sidewall 112 may include a plurality of generally laterally oriented holes 120 and/or downstream end wall 114 may include a plurality of generally axially oriented holes 122 through which pressurized air may be discharged into interior 108 of exhaust can 102. Inner flow conditioner 110 may be arranged to receive pressurized air from bleed flow conduit 44 through an inlet 118 (which may be proximate upstream base 136). Inner flow conditioner 110 may have an upstream base diameter 132 proximate inlet 118 and/or downstream base diameter 134 proximate downstream end wall 114. Upstream base diameter 132 may be larger than downstream base diameter 134. Inner flow conditioner 110 may be attached inside exhaust can 102 such that inlet 118 is disposed within upstream end wall 126 of exhaust can 102.

In operation, inner flow conditioner 110 and exhaust screen 102 may be configured to conduct pressurized air inward through inlet 118 into interior 116 of inner flow conditioner 110, through holes 120 and/or holes 122 of inner flow conditioner 110 into interior 108 of exhaust can 102, and outward through holes 106 of exhaust screen 104. In some example embodiments interior 108 of exhaust can 102 may be substantially devoid of flow obstructions between holes 120 and holes 122 of inner flow conditioner and holes 106 of exhaust screen 104.

Figure 5:
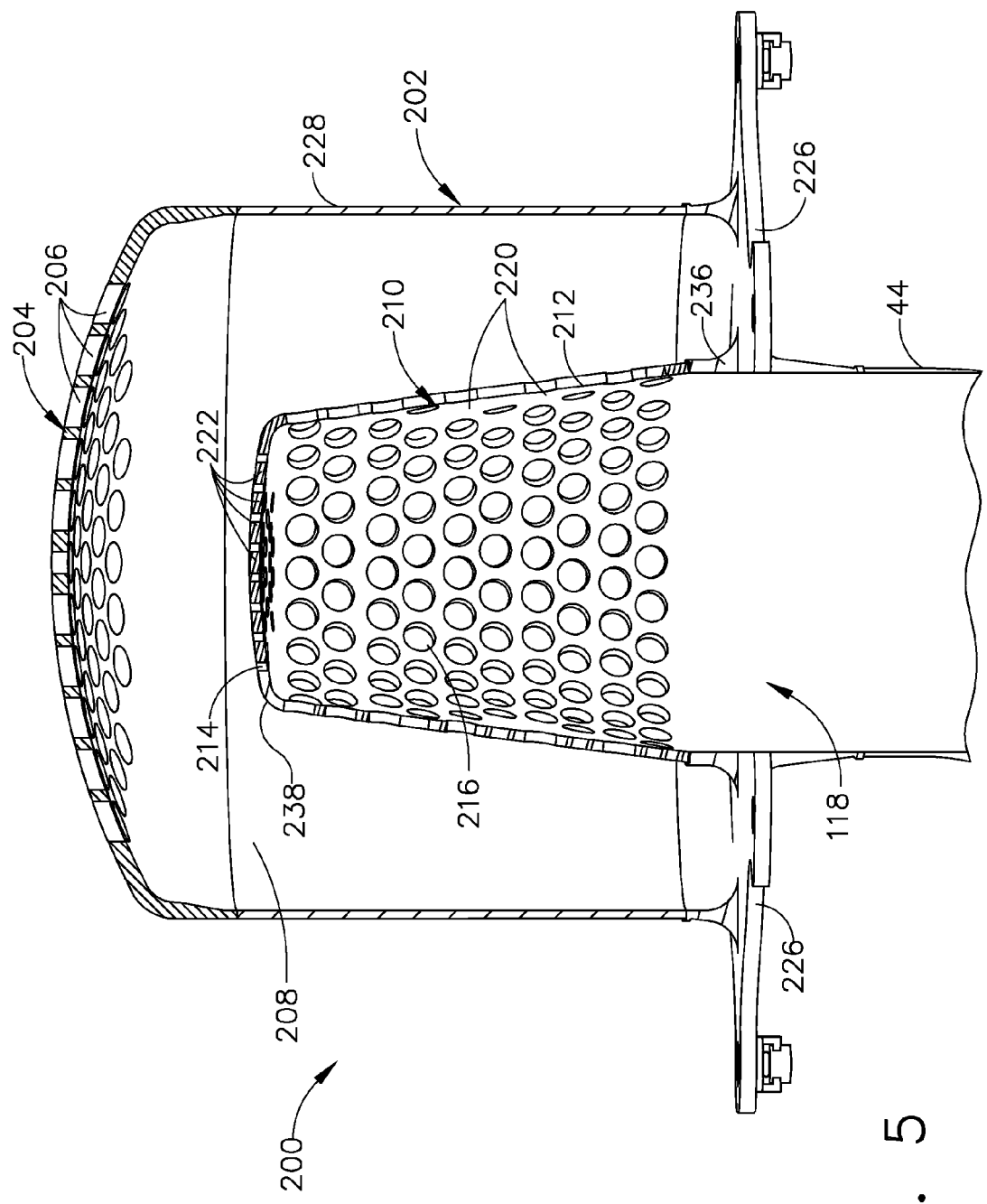
FIG. 5 is a cross-sectional view of an alternative example muffling device.

FIG. 5 is a cross-sectional view of an alternative example muffling device 200, according to at least some aspects of the present disclosure. Muffling device 200 may comprise an exhaust screen 204 (which may be generally in the form of a hollow cylinder), an upstream end wall 226 (which may be generally annular), a sidewall 228, that combine to form an assembly exhaust can 202. Exhaust screen 204 may include a plurality of holes 206 through which air may be discharged from an interior 208 of exhaust can 202. An inner flow conditioner 210 may be disposed within interior 208 of exhaust can 202. Inner flow conditioner 210 may be generally in the form of a hollow, conical frustum including an inwardly tapering sidewall 212 and a downstream end wall 214. Inner flow conditioner 210 may taper inwardly from an upstream base 236 to a downstream base 238 (which may be proximate downstream end wall 214). Inner flow conditioner 210 may be arranged generally coaxially with exhaust can 202. Sidewall 212 and downstream end wall 214 may at least partially define an interior 216 of inner flow conditioner 210. Sidewall 212 may include a plurality of holes 220 and/or downstream end wall 214 may include a plurality of holes 222 through which air may be discharged into interior 208 of exhaust can 202. Inner flow conditioner 210 may be arranged to receive air from bleed flow conduit 44 through an inlet 218 (which may be proximate upstream base 236).

Muffling device 200 (FIG. 5) may be generally similar to muffling device 50 (FIGS. 3 and 4), described above. Muffling device 200 may differ from muffling device 50 in that it may include, for example, an inner flow conditioner 210 that may differ in shape and/or size from inner flow conditioner 110. For example, inner flow conditioner 110 of muffling device 50 may extend approximately half way from upstream end wall 126 to exhaust screen 104 of exhaust can 102, while inner flow conditioner 210 may extend substantially more than half way from upstream end wall 226 to exhaust screen 204 of exhaust can 202 of muffling device 200. Example embodiments according to the present disclosure may include inner flow conditioners having various shapes and sizes. For example, some embodiments according to the present disclosure may include inner flow conditioners having shapes other than truncated cones.

Figure 6:
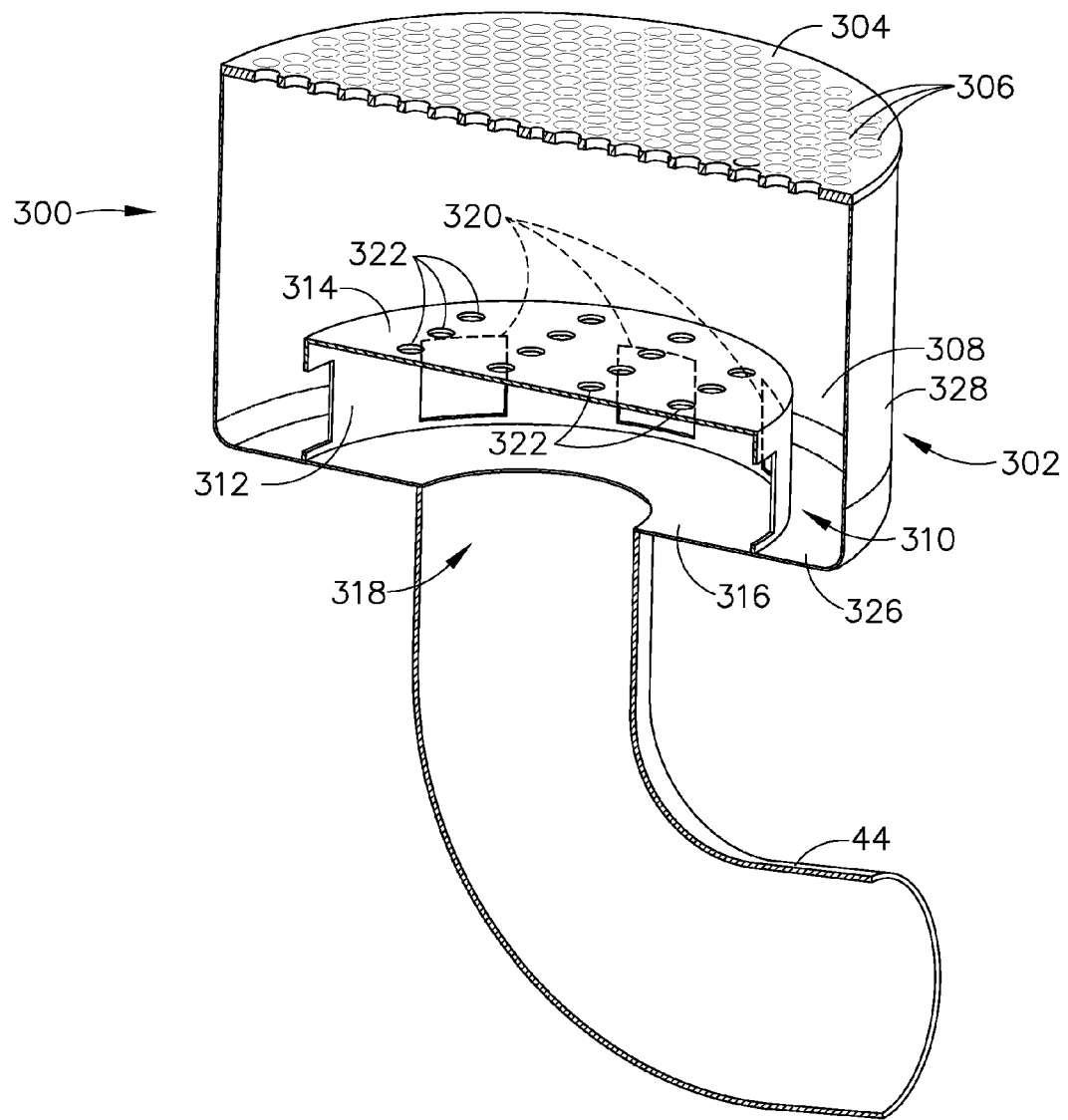
FIG. 6 is a cross-sectional view of an alternative example muffling device; all in accordance with at least some aspects of the present disclosure.

FIG. 6 is a cross-sectional view of an alternative example muffling device 300, according to at least some aspects of the present disclosure. Muffling device 300 may comprise an exhaust can 302 (which may be generally in the form of a hollow cylinder) and which may include an upstream end wall 326 (which may be generally annular), a sidewall 328, and/or an exhaust screen 304. Exhaust screen 304 may include a plurality of holes 306 through which air may be discharged from an interior 308 of exhaust can 302. Exhaust screen 304 may be substantially flat and/or curved. An inner flow conditioner 310 may be disposed within interior 308 of exhaust can 302. Inner flow conditioner 310 may be generally in the form of a hollow, cylinder including a sidewall 312 and a downstream end wall 314. Downstream end wall 314 may be substantially flat. Inner flow conditioner 310 may be arranged generally coaxially with exhaust can 302. Sidewall 312 and downstream end wall 314 may at least partially define an interior 316 of inner flow conditioner 310. Sidewall 312 may include a plurality of holes 320 (which may be in the form of slots) and/or downstream end wall 314 may include a plurality of holes 322 through which air may be discharged into interior 308 of exhaust can 302. Inner flow conditioner 310 may be arranged to receive air from bleed flow conduit 44 through an inlet 318. In some example embodiments, holes 320 through sidewall 312 of inner flow conditioner 310 may be substantially larger than holes 322 through downstream end wall 314. In some example embodiments, inner flow conditioner 310 may effectively comprise a flat plate forming downstream end wall 314 supported over inlet 318 and/or sidewall 312 of inner flow conditioner 310 may not substantially affect fluid flowing around downstream end wall 314.

Example muffling devices 50, 200, 300 may include holes 106, 120, 122, 206, 220, 222, 306, 320 322 having individual hole sizes (e.g., diameters and/or slot length/width) and areas. An individual hole may have an effective area for fluid flow that differs from its measurable physical area. A hole's effective area for fluid flow may be determined by known methods, and may depend on the size and shape of the hole. A plurality of holes, e.g., holes 106 of exhaust screen 104, may have an effective area for fluid flow that may be calculated using known methods.

In some example embodiments according to at least some aspects of the present disclosure, a ratio of an effective flow area of the holes (e.g., holes 120 and holes 122) of an inner flow conditioner (e.g., inner flow conditioner 110) to an effective flow area of an inlet (e.g., inlet 118) may be about 0.7 to about 1.75. In some example embodiments according to at least some aspects of the present disclosure, a ratio of an effective flow area of the holes of the inner flow conditioner to an effective flow area of the inlet may be about 0.75 to about 0.86.

In some example embodiments according to at least some aspects of the present disclosure, a ratio of an effective flow area of holes (e.g., holes 106 of an exhaust screen (e.g., exhaust screen 104) to an effective flow area of an inlet (e.g., inlet 118) may be about 0.9 to about 2.8. In some example embodiments according to at least some aspects of the present disclosure, a ratio of an effective flow area of the holes of the exhaust screen to an effective flow area of the inlet may be about 1.0 to about 1.9. In some example embodiments according to at least some aspects of the present disclosure, a ratio of an effective flow area of the holes of the exhaust screen to an effective flow area of the inlet may be about 2.6 to about 2.7.

Some example embodiments according to at least some aspects of the present disclosure may be configured such that the volumes of some elements are related. For example, an interior (e.g., interior 116) of an inner flow conditioner (e.g., inner flow conditioner 110) may have a volume. For example, the volume of inner flow conditioner 110 may be defined by sidewall 112, downstream end wall 114, and/or inlet 118. Similarly, an interior (e.g., interior 108) of an exhaust can (e.g., exhaust can 102) may have a volume. For example, the volume of exhaust can 102 may be defined by sidewall 128, exhaust screen 104, upstream end wall 126, sidewall 112 (of inner flow conditioner 110), and/or downstream end wall 114 (of inner flow conditioner 110). As used herein, the volume of the exhaust can may not include the volume of the inner flow conditioner, despite the inner flow conditioner being disposed within the exhaust can in some example embodiments.

In some example embodiments according to at least some aspects of the present disclosure, a ratio of a volume of an inner flow conditioner to a volume of an exhaust can may be about 0.06 to about 0.40. In some example embodiments according to at least some aspects of the present disclosure, the ratio of the volume of the inner flow conditioner to a volume of the exhaust can may be about 0.10 to about 0.22. In some example embodiments according to at least some aspects of the present disclosure, the ratio of a volume of the inner flow conditioner to a volume of the exhaust can may be about 0.125 to about 0.195. In some example embodiments according to at least some aspects of the present disclosure, these example volume ratios may provide a beneficial interaction due to cavity impedance differences, based on test and analysis.

Some example embodiments according to the present disclosure may be configured such that the velocity of an exit flow stream (e.g., exit flow stream 5 of FIGS. 1 and 2) is generally constant across the holes of the exhaust screen (e.g., holes 106 of exhaust screen 104 of exhaust can 102) at some flow conditions. For example, some embodiments may be configured such that the average ideal (e.g., isentropic) Mach number of the flow through holes 106 is greater than about 0.8 and the maximum ideal Mach number of the flow through holes 106 is less than about 1.2. More specifically, some embodiments may be configured such that the average ideal Mach number of the flow through holes 106 is greater than about 0.85 and the maximum ideal Mach number of the flow through holes 106 is less than about 1.15. Even more specifically, some embodiments may be configured such that the average ideal Mach number of the flow through holes 106 is about 0.95 and the maximum ideal Mach number of the flow velocity through holes 106 is about 1.1. The present disclosure contemplates that limiting the variation in the flow velocity through holes 106 across exhaust screen 104 may provide acoustic benefits by reducing mixing and/or reducing shear noise within the exhaust plume. The present disclosure contemplates that limiting the variation in the flow through holes 106 across downstream end wall 104 may produce a tight exhaust plume in by-pass flow path 4, which may reduce the risk of thermally damaging surfaces of adjacent aircraft structure (like the thrust reverser) that may be less capable of the temperature or thermal environment.

Some example embodiments may be configured to produce back pressure at bleed air valve 45 sufficient to reduce the shock intensity across bleed air valve 45, thus lessening the acoustic impact. Some example embodiments may be configured to hide upstream noise-generating elements, such as the high-pressure compressor 14, bleed air valve 45, and flow turning, by changing the frequency of upstream noise to a lower energy acoustic excitation. Some example embodiments may be configured to break up expansion waves as the flow transitions from the relatively small bleed flow conduit 44 to the relatively larger exhaust can 202, such that the expansion waves do not substantially propagate through holes 106 of exhaust screen 104 and into by-pass flow path 4 (or other discharge location). Some example embodiments may be configured to provide a beneficial acoustic interaction between a generally conical inner flow conditioner 110 and holes 106 of exhaust screen 104 of exhaust can 102.

Some example embodiments may be configured such that, at some flow conditions, the ideal Mach number at bleed air valve 45 is about 1.5 to about 1.95. Some example embodiments may be configured such that, at some flow conditions, the ideal Mach number at bleed air valve 45 is about 1.6 to about 1.8.

Some example embodiments may be configured such that, at some flow conditions, the average ideal Mach number at the inner flow conditioner is about 0.9 to about 1.8. Some example embodiments may be configured such that, at some flow conditions, the average Mach number at the inner flow conditioner is about 0.95 to about 1.75.

Some example embodiments may be configured such that, at some flow conditions, the average ideal Mach number at the exhaust screen is about 0.8-1.1. Some example embodiments may be configured such that, at some flow conditions, the average ideal Mach number at the exhaust screen is about 0.9-1.0. Some example embodiments may be configured such that, at some flow conditions, the average ideal Mach number at the exhaust screen is about 0.85-1.15.

Although some example embodiments have been described in connection with discharging exit flow stream 5 into by-pass flow path 4, it is within the scope of the disclosure to direct exit flow stream 5 elsewhere. For example, some muffling devices according to the present disclosure may be mounted at the engine pylori, the turbine rear frame, and/or core nozzle/center bleed tube. Some example embodiments may be arranged to direct exit flow stream 5 generally behind gas turbine engine assembly 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A muffling device, comprising:
   an inner flow conditioner shaped as a generally conical frustum comprising an upstream base and a downstream base, a diameter of the upstream base being larger than a diameter of the downstream base, the inner flow conditioner comprising
      an inlet approximate the upstream base,
      a generally circular inner flow conditioner downstream end wall, the inner flow conditioner downstream end wall being generally orthogonal to a longitudinal axis of the conical frustum and comprising a plurality of generally longitudinally oriented inner flow conditioner downstream end wall holes, and
      an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes; and
   an exhaust can disposed substantially around the inner flow conditioner and shaped as a generally circular cylinder, the exhaust can comprising
      a generally annular upstream end wall disposed approximate the upstream base of the inner flow conditioner and substantially circumscribing the upstream base of the inner flow conditioner,
      a generally circular exhaust screen comprising a plurality of exhaust screen holes, and
      a generally circular exhaust can sidewall extending from approximate the upstream end wall to approximate the exhaust screen;
   wherein the inner flow conditioner and the exhaust can are configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings.

2. The muffling device of claim 1, wherein the exhaust screen is outwardly curved.

3. The muffling device of claim 1, further comprising a bleed flow conduit operatively connected between the inlet opening of the inner flow conditioner and a bleed air valve configured to selectively bleed a compressor of a gas turbine engine via the bleed flow conduit.

4. The muffling device of claim 1, wherein a length of the exhaust can is less than about one third of the sum of the length of the exhaust can and a length of the bleed flow conduit.

5. The muffling device of claim 1, wherein the exhaust can interior is substantially devoid of flow obstructions between the plurality of inner flow conditioner holes and the exhaust screen holes.

6. The muffling device of claim 1, wherein a ratio of an effective flow area of the inner flow conditioner downstream end wall holes and the inner flow conditioner sidewall hoes to an effective flow area of the inlet is about 0.7 to about 1.75.

7. The muffling device of claim 1, wherein the ratio of the effective flow area of the inner flow conditioner downstream end wall holes and the inner flow conditioner sidewall hoes to the effective flow area of the inlet is about 0.75 to about 0.86.

8. The muffling device of claim 1, wherein a ratio of an effective flow area of the exhaust screen holes to an effective flow area of the inlet is about 0.9 to about 2.8.

9. The muffling device of claim 1, wherein the ratio of the effective flow area of the exhaust screen holes to the effective flow area of the inlet is about 1.0 to about 1.9.

10. The muffling device of claim 1, wherein the ratio of the effective flow area of the exhaust screen holes to the effective flow area of the inlet is about 2.6 to about 2.7.

11. The muffling device of claim 1, wherein a ratio of an interior volume of the inner flow conditioner to an interior volume of the exhaust can is about 0.06 to about 0.40.

12. The muffling device of claim 1, wherein a ratio of an interior volume of the inner flow conditioner to an interior volume of the exhaust can is about 0.10 to about 0.22.

13. The muffling device of claim 1, wherein a ratio of an interior volume of the inner flow conditioner to an interior volume of the exhaust can is about 0.125 to about 0.195.

\* \* \* \* \*

UNITED STATES PATENT AND TRADEMARK OFFICE
CERTIFICATE OF CORRECTION

| | | |
|---|---|---|
| PATENT NO. | : 8,430,202 B1 | Page 1 of 1 |
| APPLICATION NO. | : 13/347728 | |
| DATED | : April 30, 2013 | |
| INVENTOR(S) | : Mason et al. | |

It is certified that error appears in the above-identified patent and that said Letters Patent is hereby corrected as shown below:

In the Specification

In Column 9, Line 16, delete "pylori," and insert -- pylon, --, therefor.

In the Claims

In Column 10, Line 33, in Claim 6, delete "sidewall hoes" and insert -- sidewall holes --, therefor.

In Column 10, Line 37, in Claim 7, delete "sidewall hoes" and insert -- sidewall holes --, therefor.

Signed and Sealed this
Fifteenth Day of April, 2014

Michelle K. Lee
*Deputy Director of the United States Patent and Trademark Office*